United States Patent [19]

Winterton

[11] Patent Number: 4,649,454

[45] Date of Patent: Mar. 10, 1987

[54] APPARATUS AND METHOD FOR DETECTING AN OPEN GROUND CONNECTION

[76] Inventor: Arvin O. Winterton, 1133 W. 6th North, Salt Lake City, Utah 84116

[21] Appl. No.: 659,370

[22] Filed: Oct. 9, 1984

[51] Int. Cl.$^4$ ............................................. H02H 9/00
[52] U.S. Cl. ........................................ 361/50; 361/48; 361/42; 339/14 P
[58] Field of Search ................. 361/42, 46, 47, 48, 361/49, 50; 340/649; 324/509, 510, 550, 556; 339/14 P, 113 R, 113 L, 176 P; 174/5 R, 55 B, 55 G

[56] References Cited

U.S. PATENT DOCUMENTS

| | | | |
|---|---|---|---|
| 3,407,336 | 10/1968 | Embree | 361/50 |
| 3,426,342 | 2/1969 | De Langis | 340/255 |
| 3,737,765 | 6/1978 | Lee et al. | 324/51 |
| 3,783,340 | 1/1974 | Becker | 361/50 |
| 3,890,030 | 6/1975 | McDaniel | 340/649 |
| 4,118,690 | 10/1978 | Paynton | 340/656 |
| 4,389,640 | 6/1983 | Dawdy | 340/640 |
| 4,398,188 | 8/1983 | Feigal et al. | 340/650 |

FOREIGN PATENT DOCUMENTS 861105  1/1971  Canada ............................. 339/176 P

OTHER PUBLICATIONS

"Standard for Safety: Medical and Dental Equipment", by Underwriters Laboratories, Inc. (Jul. 1982).
"Hospital Electrical Standards Compendium", by American Society for Hospital Engineering (Jul. 1981).
"Safe Current Limits for Electromedical Apparatus", by the Association for the Advancement of Medical Instrumentation (1978).
Hubbell catalog, Technical Data Section, pp. 8, 10 and 18–19.
"Hospital Isolating Systems," by the Square D. Company.
JCAH Standard II (Functional Safety and Sanitation).
The New Field of "Electrical Hygiene," catalog brochure of the Daniel Woodhead Company.
Valleylab, Inc., Marketing Brochure, "Enter the Era of Total Electrosurgical Safety: Return Electrode Monitor (REM) System" (1983).

Primary Examiner—A. D. Pellinen
Assistant Examiner—H. L. Williams
Attorney, Agent, or Firm—Workman, Nydegger & Jensen

[57] ABSTRACT

An apparatus and method for continuously monitoring and detecting an open ground connection which may occur anywhere between the chassis of an electrical appliance and the grounding terminal of a receptacle. The apparatus includes a plug having a grounding blade and a sensing blade which together form an assembly adapted for insertion into the grounding terminal of the receptacle. When inserted into the grounding terminal, the grounding and sensing blades complete a closed current path formed by a sensing conductor connected to the sensing blade and a grounding conductor connected to the grounding blade. The sensing conductor is connected to an inverter and the input of the inverter is also connected through a resistor to the DC power source so as to place the small current on the sensing conductor at the input of the inverter. If an open condition is detected at any point between the appliance chassis and the grounding terminal of either the sensing or grounding conductors, the output of the inverter changes state so as to indicate an alarm condition indicating that the ground connection is not complete.

35 Claims, 14 Drawing Figures

APPARATUS AND METHOD FOR DETECTING AN OPEN GROUND CONNECTION

BACKGROUND

1. The Field of the Invention

This invention relates to devices that detect an open ground connection, more particularly to a device which automatically alerts operating personnel upon detection of an open ground connection occurring anywhere between the chassis of an electrical appliance and the grounding terminal of a standard wall receptacle.

2. The Prior Art

The use of modern electrical appliances presents a potential shock hazard to any person using such an appliance. Fortunately, the design and manufacture of modern electrical appliances minimizes this hazard. Still, wear, abuse or damage to an appliance may result in a voltage potential being placed on a conducting surface accessible to a user. With the common supply line voltages between 110 and 125 volts rms, and current carrying capabilities of 15 amperes and greater, any shock that may occur is potentially a lethal one. Furthermore, static charge accumulations and stray currents created by capacitive and inductive coupling present a shock hazard under some circumstances.

In order to avoid these shock hazards, both industry and government agencies have promulgated regulations requiring that many appliances be provided with an independent grounding connection in cooperation with two or more current supplying conductors. In a conventional electrical distribution system, the most prevalent means of supplying a grounding connection is the use of an independent conductor, referred to as a grounding conductor, which is used to connect the appliance chassis to the grounding bus of the permanent wiring system. The grounding conductor is in addition to, and independent of, the hot conductor (or conductors) and the neutral conductor (if used) which apply voltage and carry current to the appliance.

The conductors used to connect an appliance to the permanent wiring system are typically arranged within a single covering generally referred to as the power cable. Two of the most common methods of providing the necessary detachable connections between power cable conductors and their respective hot, neutral and ground buses of the permanent wiring system are known in the art as a nonlocking "straight blade" plug in conjunction with a corresponding "straight blade" receptacle or a locking "twist-lock" plug in conjunction with a "twist-lock" receptacle. In the case of a two wire system, where a hot, neutral and grounding bus are provided in the permanent wiring system (i.e., three wire connection) three blades are provided on the plug. By far the most common device used to make detachable connections with a three wire permanent wiring system is known in the art as a 15 amp, 125 volt, 3 wire, grounding, straight blade plug and its corresponding receptacle. In other systems using more than one hot and one neutral bus, such as three and four wire systems, whether single or polyphase, the plug and receptacle is configured so as to provide an independent grounding connection.

With a grounding line properly connected to a grounding bus and to the appliance, if a line voltage is placed on an exposed conducting surface or chassis of an appliance, the properly connected grounding conductor will provide a very low resistance path to ground. Because of the low resistance path to ground, current flow less than the rating of the circuit breaker and fuse will minimize potential chassis voltages with respect to ground. Current flow exceeding the designed rating of the line will trip the circuit breaker or fuse, thus interrupting the voltage and current to the appliance. Considering the severity of the potential shock a person may receive when contacting a 125 volt rms potential, the importance of maintaining the integrity of a proper ground is readily apparent.

Either through abuse, damage or normal wear, a proper ground connection may become inoperative. The most common cause of failure of the ground connection lies with a lack of continuity of the grounding conductor of the power cable or the lack of continuity between the plug grounding blade and the receptacle grounding terminal. The danger presented by an open ground connection is high because it is generally unnoticeable by a casual observer, and unlike the loss of a neutral or hot conductor, most appliances will function normally without a proper ground connection to the chassis of the appliance. Therefore, not only does a potential shock hazard exist, but it is undisclosed until a shock occurs or until the ground connection is examined. Such a condition poses a serious threat in any circumstance, but such a condition is particularly dangerous in a health care facility such as a hospital.

Under most circumstances a current of greater than 50 milliamperes passing through the body trunk of a healthy person is necessary to cause severe pain or injury. However, some authorities claim that currents as small as 10 microamperes, when passed directly through the heart, may cause ventricular fibrillation.

In a hospital setting the patients, many of whom are immobile and/or in a weakened physical condition, are particularly susceptible to the hazards of an electric shock. Since such patients are often intimately connected to life support systems which in turn require connection to electrical systems, this problem requires extreme care and constant surveillance.

Shock hazards may be caused by problems in an electrical distribution system, improper wiring, by an appliance malfunction, by leakage currents created by capacitive and inductive coupling between current carrying conductors and various structures, or even by static electricity. Thus, proper grounding not only guards against the potential shock hazard from equipment leakage currents or electrical system malfunction, but also protects static sensitive semiconductor devices and electrical equipment from destruction due to electrical static discharge.

As noted above, while the dangers of electric shock are not unique to a hospital environment, there is an acute need in that environment to insure that the protection afforded by a properly grounded system is present. Because of the importance of insuring that there is a proper ground connection, several safety measures have been devised.

One approach, and perhaps the most common, is for a qualified technician to periodically check the continuity of the ground connection between the chassis of the appliance and the grounding blade of the plug. Several safety organizations require that such periodic tests be made. For example, the National Fire Protection Association suggests in the case of portable patient care equipment that the resistance from appliance chassis to plug grounding blade be checked twice each year and that it be below 0.15 ohms. NAPA 76B, 1980 ed., para. 4-4.5.2. The Joint Committee on the Accreditation of Hospitals ("JCAH") also requires that equipment be performance tested twice each year, including the grounding system. 1982 JCAH Accreditation Manual for Hospitals, page 37.

While the periodic test approach is commonly used, it has several serious drawbacks. First, there is nearly always a significant period of time between the occurrence of a malfunction and the next periodic inspection. Second, manual inspections by a technician may not detect malfunctions that occur only intermittently. Third, in such checks, the integrity of the connection between the plug grounding blade and the receptacle grounding terminal is not checked. It is often the case that a grounding blade and receptacle grounding terminal makes a marginal physical, and thus electrical, connection because of wear or damage. Fourth, in addition to the above mentioned drawbacks, use of technicians to make periodic checks and maintain records requires technician time and is an additional operating expense.

Another approach in the prior art is to provide a redundant connection between the appliance chassis and the grounding bus and then monitor the continuity of the connection. This approach requires that an appliance be provided with a primary grounding connection integral with the power cable plug and receptacle combination. A redundant connection is then provided from the appliance chassis to the permanent wiring system grounding bus at a point away from primary grounding connection to the bus. A small alternating current, generally above 10 KHz and below 100 KHz, is induced in the closed circuit created by the primary grounding conductor, the appliance chassis, the redundant grounding conductor and the grounding bus. The current flow in the redundant grounding conductor is monitored. An increase in resistance in either of the grounding conductors is indicated by a drop in the current flow.

A drawback of this approach is that it requires the use of a separate, redundant ground which increases cost and generally requires a separate grounding conductor which adds to the number of cords "running" in an area from the appliance to the permanent wiring system ground bus. See 1981 NAPA 70 Article 517 para. (c) (1-4) (deleting the standard of 1974 NAPA 56A requiring "equi-potential grounding systems" in which a redundant ground was often required).

Still another approach has been to place a DC or 60 Hz line current on a single grounding line and provide a means for indicating and/or disconnecting the neutral and hot conductors when the current drops below a predetermined threshold indicating an increase in the ground resistance.

The major disadvantage of this method is that the devices generally use relays, or semiconductor devices that require an unsatisfactorily high current flow on the ground conductor for proper operation. Furthermore, such devices do not provide a means to indicate impending plug grounding blade and receptacle grounding terminal failure. Thus, such devices do not provide adequate assurance against shock hazards, especially in the environment of a hospital.

The present invention overcomes the disadvantages of the prior art and introduces several additional benefits to the art.

BRIEF SUMMARY AND OBJECTS OF THE INVENTION

The present invention is directed to an apparatus and method for continuously monitoring and detecting an open ground connection which may occur anywhere between the chassis of an electrical appliance and the grounding terminal of a standard receptacle. The apparatus includes a plug with a novel means of providing two independent connections to the grounding terminal of a three or four wire receptacle. In one presently preferred embodiment of the invention the two independent connections to ground are provided by a grounding blade and a sensing blade which are electrically insulated and which both connect to the grounding terminal of the receptacle. When connected to the grounding terminal of the receptacle, the grounding and sensing blades are shorted together to provide a closed circuit. The closed circuit made by the grounding and sensing blades is communicated to the electrical appliance by way of independent grounding and sensing conductors which run through the power cable. A very small current, typically less than 10 microamperes, is placed on the closed circuit formed by the grounding and sensing blades and a digital inverter gate is configured such that the output of the inverter is driven low if the closed circuit is opened at any point. A means is provided to signal when the output goes low, thus notifying users that an improper ground connection has been detected.

It is, therefore, a primary object of the present invention to provide an apparatus and method for continuously monitoring and detecting, and then signaling to a user when an improper ground connection to an electrical appliance has occurred.

Further, an important object of the present invention is to provide an apparatus and method for detecting an open ground connection in such a way that limits the current placed on any exposed conducting surface or non-current supplying conductor to a safe level.

Another object of the invention is to provide an apparatus and method which will indicate an impending or intermittent grounding blade to grounding terminal contact failure so that such failure can be detected and fixed at an early data.

Another object of the present invention is to provide an apparatus for detecting an open ground connection that is simple, economical, and is compatible with existing receptacles and can be easily adapted for use with existing appliances and electrical distribution systems.

These and other objects and features of the present invention will become more fully apparent from the following description and appended claims taken in conjunction with the accompanying drawings.

DETAILED DESCRIPTION OF THE PREFERRED EMBODIMENTS

Figure 1:
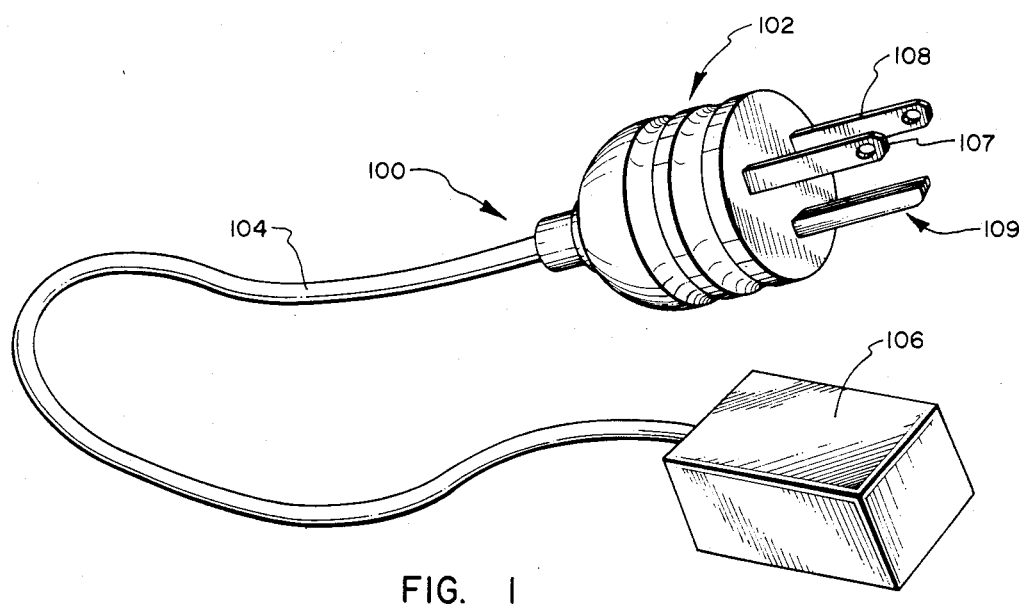
FIG. 1 is a perspective view of one presently preferred embodiment of the invention.

Reference is now made to the drawings wherein like parts are designated with like numerals throughout. Referring more particularly to FIG. 1, the apparatus comprises a plug generally designated at 102, a cable 104 and a detection and alarm circuit which may be enclosed in a housing 106.

Figure 5:
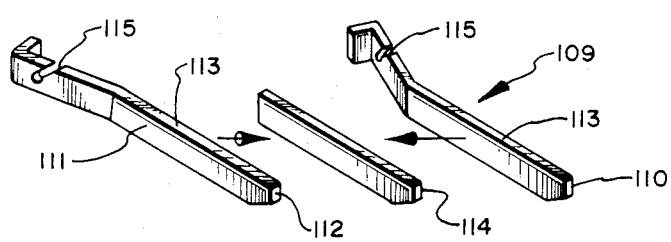
FIG. 5 is an exploded perspective view of the grounding and sensing blade assembly shown in the embodiment of FIG. 1.

Plug 102 is constructed so as to be compatible with a standard wall receptacle 201 (see FIG. 6) that conforms to the National Electrical Manufacturers Association (NEMA) requirements. The blades 107-108 of plug 102 connect to the neutral and hot terminals 206-207 (see FIG. 6) of a standard wall receptacle and are the same as those common on plugs complying with the NEMA standard. However, in place of the U-shaped grounding blade, which is common in the art, the plug 102 has an assembly 109 comprising a grounding blade 110 (see FIGS. 3 and 5) and a sensing blade 112 which are designed so as to be dimensionally compatible with the NEMA standard for the grounding jack and terminal 208 (see FIG. 6) of a standard wall receptacle.

The grounding and sensing blades 110 and 112 are electrically isolated from each other so that each makes an independent connection with the receptacle grounding terminal 208. To facilitate electrical isolation and increase the structural strength of the assembly 109, an isulating material 114 is laminated or molded between the blades, as shown best in FIGS. 3 and 5. The assembly 109 formed by the blades 110 and 112 and the insulating material 114 is substantially rectangular along its longitudinal axis. This shape is advantageous for providing the largest possible contact area between the receptacle grounding terminal 208 and the grounding and sensing blades 110 and 112, it being of benefit to have a relatively large contact area in order to minimize electrical resistance. Furthermore, the use of a substantially rectangular shape provides for compatibility with receptacles of various manufactureres, which typically provide two grounding terminal contacts oriented to press against the outward facing vertical sides 111 of assembly 109. However, since some receptacle manufacturers provide grounding terminal contacts oriented in a way to contact the top sides 113 of assembly 109, use of a substantially rectangular shape provides compatibility with receptacles regardless of whether the receptacle grounding terminal contacts are oriented to contact the vertical sides 111 or top sides 113.

The use of a solid, rectangular shaped assembly 109 also avoids a problem associated with "U ground" prongs common in the art, in that the solid rectangular assembly 109 cannot collapse or be bent in on the sides, as often happens in the case of a "U ground" due to wear, abuse or damage. When the sides of a "U ground" are collapsed or bent the electrical connection from the plug ground to the receptacle ground system may be insecure, intermittent or non-existent. Thus, the design of assembly 109 significantly improves the reliability of the apparatus 100 of the present invention.

Figure 3:
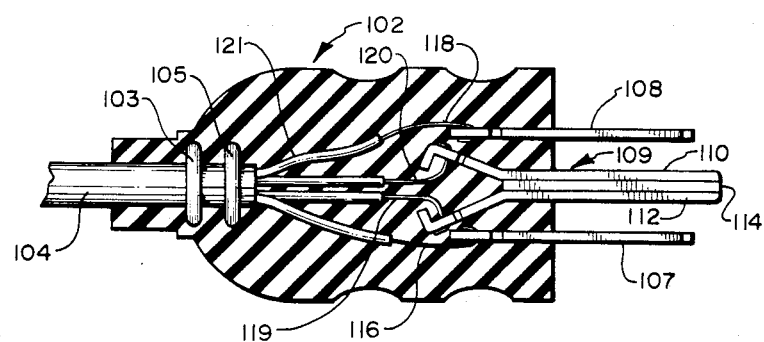
FIG. 3 is a cross-sectional view of the embodiment of FIG. 1 taken along lines 3—3.
Figure 4:
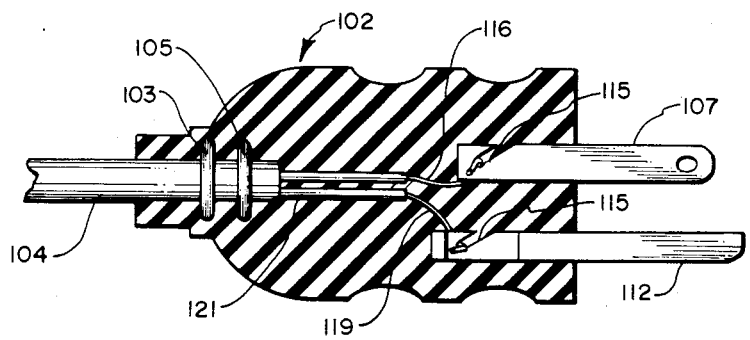
FIG. 4 is a cross-sectional side view of the embodiment of FIG. 1 taken along lines 4—4.

Referring to FIG. 3, it will be seen that each of the four blades indicated at 107, 108, 110 and 112 are individually connected to a separate conductor as indicated at 116, 118, 120 and 119, respectively. As previously mentioned, one of the blades, as for example blade 108 is connected to the hot conductor 118 while the other blade 107 is connected to a neutral conductor 116. The other blades 110 and 112 are grounding and sensing blades, respectively, which may be used as hereinafter more fully described to detect the presence of an improper ground connection with a conventional grounding terminal in a wall receptacle. Each of the conductors 116, 118, 119 and 120 are attached as shown best in FIGS. 4 and 5 through a slot 115 provided in each blade. Each conductor may be permanently soldered after it is placed in slot 115. The conductors may also be insulated as indicated at 121 and the separate conductors are then carried by the cable 104 for attachment at the other end to a detection and alarm circuit, as illustrated and described more fully in connection with FIGS. 6-8 below. Cable 104 is anchored in plug 102 by cable restraints 103 and 105 which prevent the cable 104 from being pulled loose.

Figure 5A:
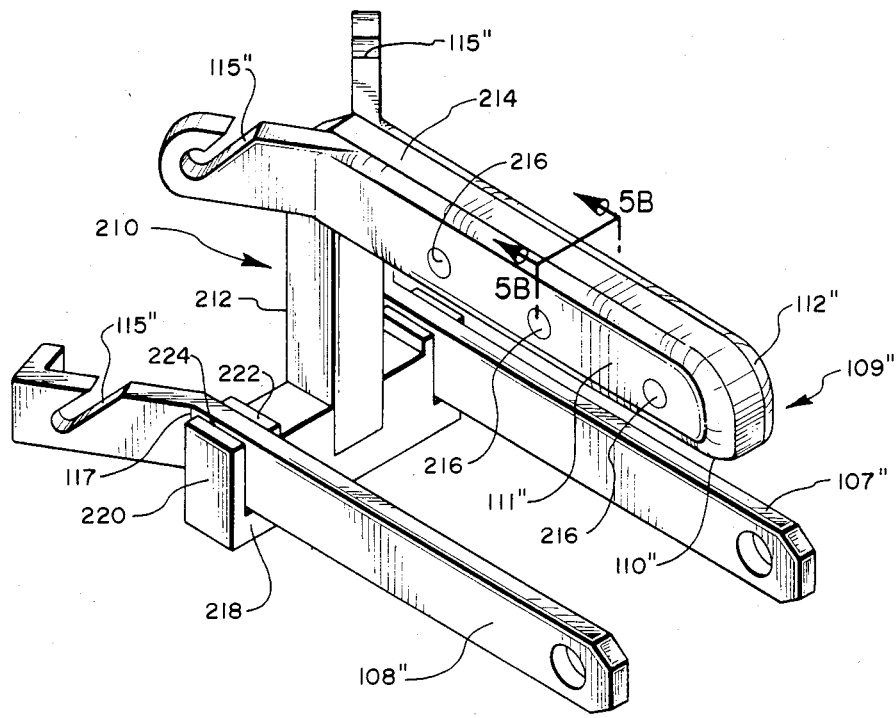
FIG. 5A is a perspective view of another embodiment of the grounding and sensing blades as used in conjunction with a carrier assembly.
Figure 5B:
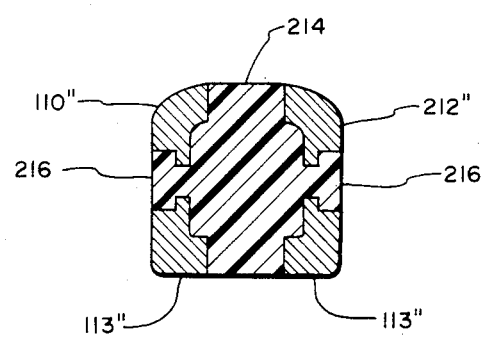
FIG. 5B is a cross-sectional view taken along line 5B—5B of FIG. 5A.

In another preferred embodiment as illustrated in FIGS. 5A and 5B, the grounding and sensing blades 110" and 112" are mounted on a carrier assembly generally designated at 210. As in the case of the embodiment of FIG. 5, in FIG. 5A the grounding and sensing blades 110" and 112" are separated by an insulating material 214 which electrically isolates them one from the other so that each blade makes an independent connection with the receptacle grounding terminal 208 (see FIGS. 6-8). However, in the case of the embodiment of FIG. 5A the insulating material 214 is formed as an integral part of the carrier assembly 210.

The carrier assembly includes a vertical support member 212 which supports the horizontal member 214 which serves as the insulating material. The grounding and sensing blades 110" and 112" are secured to the insulating material which forms the horizontal member 214 by means of locator pins 216 which extend through holes formed in the sides 110" of the grounding and sensing blades 110" and 112". The locator pins 216 may be sonically welded so as to form a smooth flat surface along the sides 110" of the grounding and sensing blades 110" and 112".

With further reference to FIG. 5A, carrier assembly 210 also includes a base 218 which forms a further part of the integral carrier assembly 210. Formed at the ends of base 218 are two upright members 220 and 222 which define a slot 224 between them. The slot 224 receives the blades 108" and 107" at the point 117 where the blades are bent. Blades 108" and 107" are adapted for connection to the hot and neutral terminals of a standard wall receptacle, and are essentially the same in their construction as the blades 107 and 108 described above.

Use of the carrier assembly 210 as illustrated in FIG. 5A has the advantage that it facilitates molding the body of the plug 102 around the various blades 107″, 108″, 110″ and 112″. Also, the carrier assembly advantageously provides a means by which the overall durability and structure of the plug 102 is enhanced because when inserting or removing the plug 102 from the wall receptacle the force is taken up by the carrier assembly 210 thereby helping to prevent the connecting wires 116, 118, 119 and 120 from being pulled off of the various blades by providing a fixture in the soldering of the wires to the blades.

Figure 3A:
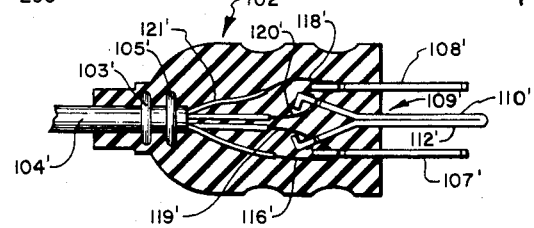
FIG. 3A is a lateral cross-sectional view of another embodiment of a plug which may be used in accordance with the present invention.

While it is presently preferred that grounding and sensing blades 110 and 112 be separated by an insulating material, it is also possible to nevertheless utilize grounding and sensing blades 110′ and 112′ which are also joined together as illustrated in the embodiment of FIG. 3A. Thus, as shown in FIG. 3A the grounding and sensing blades 110′ and 112′ are joined together and are not separated by an insulating material.

Figure 2:
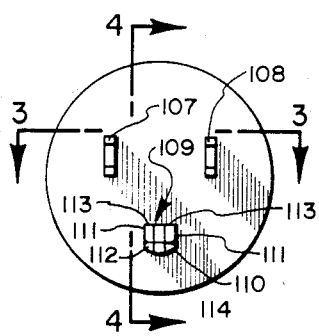
FIG. 2 is an elevated end view of the plug of FIG. 1 showing the hot, neutral, grounding and sensing blades.
Figure 6:
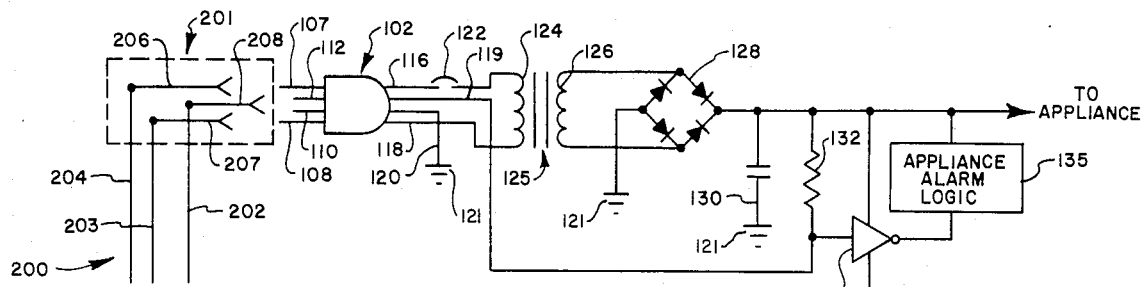
FIG. 6 is a schematic diagram illustrating one presently preferred embodiment of the invention.
Figure 7:
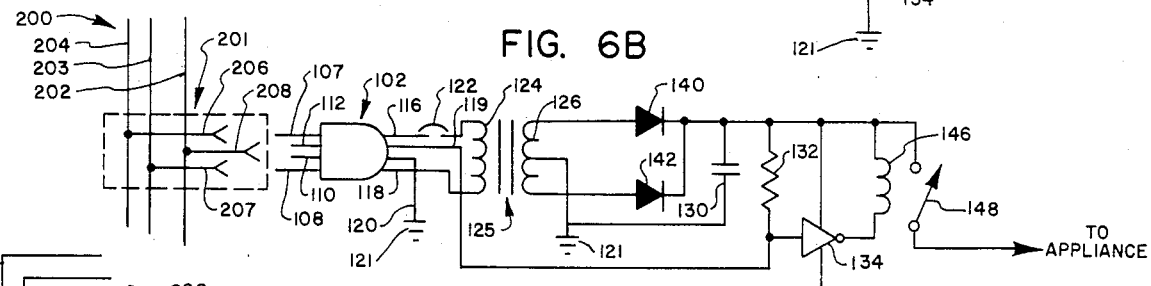
FIG. 7 is a schematic diagram of another embodiment of the invention in which the circuit includes a normally closed relay to interrupt the power supply when an improper ground is detected.
Figure 8:
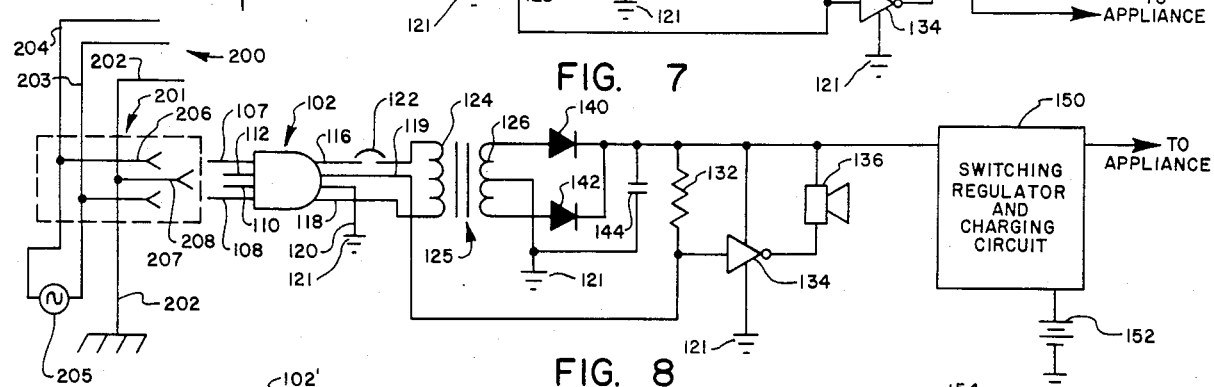
FIG. 8 is a schematic diagram showing the same basic detection circuit as in FIG. 7, but modified to include an audio transducer as an alarm.

The majority of receptacles in use today provide for grounding terminal contacts which press against the vertical sides 111 (see FIGS. 2 and 5) of assembly 109 making contact with both the grounding blade 110 and sensing blade 112. In the present invention, both blades 110 and 112 must make appropriate contact with the grounding terminal or an alarm will sound indicating an improper ground. Thus, if a receptacle's grounding terminal contacts have been weakened because of wear, abuse or damage so that only the grounding blade 110 or sensing blade 112 is being properly grounded, an alarm condition will indicate an improper ground. The detection and alarm circuit used to sense and indicate the improper ground connection is shown in FIGS. 6-8. It will be appreciated that the embodiments of FIGS. 6-8 are merely representative of possible configurations.

Referring first to FIG. 6, the plug 102 is connected directly to a conventional wall receptacle, represented schematically at 201 so as to connect to the permanent wiring system generally designated at 200. The wiring system generally designated at 200 is representative of a 3 wire distribution system wherein conductors 203 and 204 represent current carrying conductors connected to AC power source 205, while conductor 202 is connected to an earth ground. The hot and neutral conductors 116 and 118 of plug 102 are used to communicate voltage and current to an appliance (not shown) in an ordinary fashion. The four conductor cable 104 is connected to an appliance via the circuit of FIG. 6 as follows.

The grounding conductor 120 is connected to the appliance chassis as indicated at ground 121 in a manner that provides a secure connection. The sensing conductor 119 is connected to the input of a digital inverter 134. A resistor 132 is connected between the output of a full wave bridge rectifier 128 and filtering capacitor 130, and the input of the inverter 134. Power is supplied to rectifier 128 by the windings 124 and 126 of a transformer 125, which is connected at the primary winding 124 to the hot and neutral conductors 116 and 118. The negative terminal of rectifier 128 is connected to the appliance chassis as indicated at ground 121. A circuit breaker 122 may be provided on conductor 116, as is conventional in the art.

The value of resistor 132 is selected so that the current through resistor 132 is less than 10 microamperes. The power input of inverter 134 is connected to the output of rectifier 128 thus providing the operating voltage and current for the inverter. The ground terminal of inverter 134 is connected to the chassis ground 121 of the appliance.

The output of inverter 121 is connected to a device that indicates when the output voltage is driven low. In digital inverter circuits, such as used in the present invention, the output has only two stages: a "high" state when the output voltage is equal to a predetermined voltage level and a "low" state when the output voltage is substantially zero.

Figure 6A:
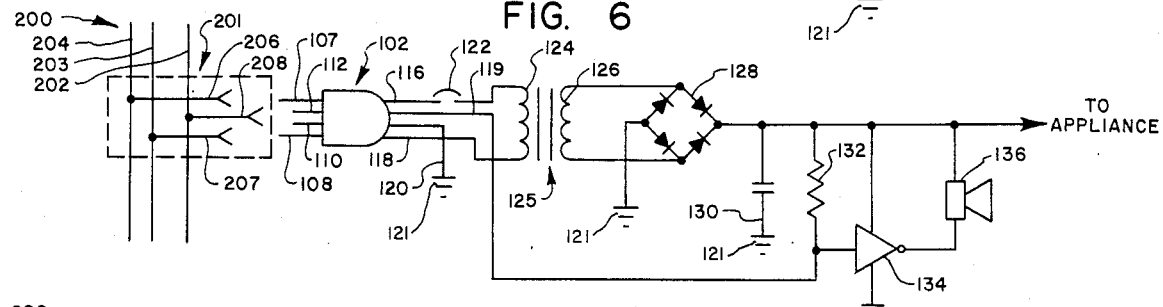
FIGS. 6A-6B are schematic diagrams illustrating the same basic detection circuit as in FIG. 6, but showing the use of alternative types of alarm circuitry.
Figure 6B:
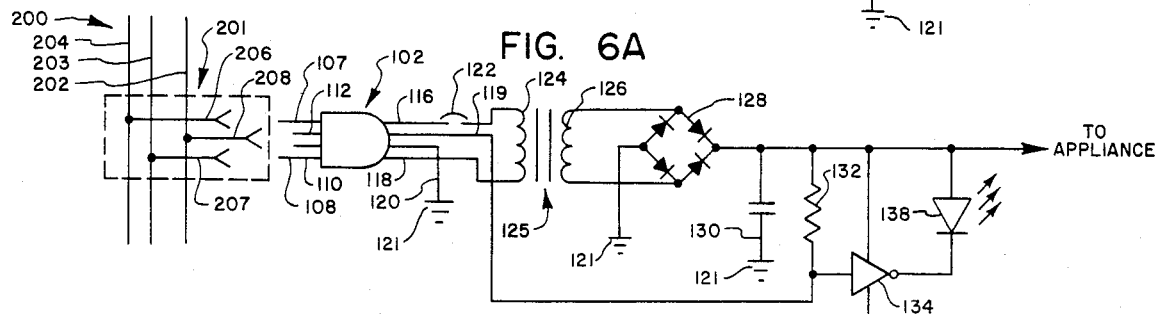

In portable patient care equipment found in a hospital it is possible in many cases to make use of the internal alarm mechanisms of the appliance to signal when an improper ground is detected, as schematically indicated at 135 in FIG. 6. In some cases it may be more efficient when retrofitting an appliance with the present invention to avoid using the appliance's internal alarm logic. Moreover, although hospital equipment often will include such alarm logic, other types of appliances may not. Thus, as shown in FIG. 6A an audio indicator 136 including driving electronic circuitry (not shown) may be used as a means to signal when the output of inverter 134 becomes low. Likewise, FIG. 6B shows a light emitting diode 138 which provides an alarm indication in place of audio transducer 136. It should be understood that many different means are available to signal when an improper ground connection is detected and the embodiments of FIGS. 6, 6A and 6B are merely exemplary of presently preferred methods.

When the alarm and detection circuit is in normal operation a DC voltage is applied to resistor 132, inverter 134 and the alarm logic 135. When a proper ground connection is made between the grounding and sensing blades 110 and 112 and the grounding terminal 208, both the grounding conductor 120 and the sensing conductor 119 will be grounded and thus the potential at any point along either conductor will be substantially zero. The value of resistor 132, which is typically greater than 1 Megohm, insures that as long as the sensing conductor 119 is grounded, nearly all of the voltage applied to resistor 132 is dropped across resistor 132, providing a low input to inverter 134. The low input causes the inverter output to go high thus indicating a proper ground on the sensing conductor 119. If the plug 102 is not properly connected to ground, due to a worn or broken connection, current will cease to flow in the sensing conductor 119 and the input to inverter 134 will go high, causing the output to go low.

The characteristics of inverter 134 are such that when the output is in a low state, current is allowed to flow in a direction from the output to the input or ground terminal 120, thus providing a current path for initiating the alarm logic 135.

In the embodiment of FIG. 7, full wave bridge rectifier 128 has been replaced by a rectifier comprised of diodes 140 and 142. The rectified output from the diodes 140 and 142 is filtered by capacitor 130 as in the circuit of FIG. 6, and is applied in resistor 132 in the same manner described previously. The principal difference in the embodiment of FIG. 7 is that the output of inverter 134 is input to the coil 146 of a normally closed relay which maintains switch 148 closed. When an open ground connection is sensed as described above, the output of inverter 134 is driven low so that the relay opens switch 148 thereby opening the circuit, disabling the appliance and providing an alarm condition which is indicated by the disconnection of the appliance. In the embodiment of FIG. 6, in the event of an alarm condition the appliance continues to remain connected to the circuit. In contrast, in the embodiment of FIG. 7 when an alarm condition is detected the normally closed relay opens switch 148, thereby isolating the appliance from the circuit. As previously mentioned, typically the current level is maintained at or below 10 microamperes so that the current which flows from the output of the inverter 134 to the ground path 120 is maintained at a safe level given the typical operating voltages in the hospital or home environments.

Figure 8A:
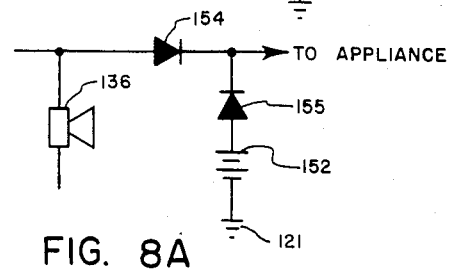
FIG. 8A is an illustration of an arrangement to isolate the battery 152 of FIG. 8.

In the embodiment of FIG. 8, the circuit is essentially the same as that of FIG. 7 except that the alarm function is provided by an audio indicator 136 as described above in connection with FIG. 6A, and the output of the inverter 134 is also connected to a switching regulator and charging circuit 150 of the appliance, which may be used to isolate a battery 152 which may be used as a backup power source for the appliance. It is not uncommon in connection with hospital equipment to provide battery backup. However, in that event if the plug 102 is disconnected for any reason, the backup battery 152 may cause the alarm circuitry to provide an alarm signal unless it is isolated by means of the switching regulator and charging circuit 150. Other means may also be provided for isolating the battery 152, as for example the diode arrangement 154–155 illustrated in FIG. 8A. As shown in FIG. 8A, diode 154 is forward biased with respect to the output of the inverter and diode 155 is reverse-biased with respect to the output of the inverter 134, but with respect to battery 152 diode 155 is forward-biased and diode 154 is reverse-biased so that the alarm detection circuit will be isolated from battery 152. Under this circumstance, the alarm condition may only be detected when the alarm circuit is powered by the AC supply as opposed to the backup battery 152 of the appliance.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus that detects an open ground connection occurring anywhere between a chassis of an electrical appliance and a grounding terminal of a receptacle, said apparatus comprising:
   a plug comprising a grounding blade and a sensing blade removably connectable in common to said grounding terminal of said receptacle, said plug further comprising means for electrically isolating said grounding blade and said sensing blade from each other, and a plurality of other blades removably connectable to current supplying terminals of said receptacle;
   a cable comprising a grounding conductor and a sensing conductor connected to form a closed current path running from said grounding blade at said grounding terminal at said receptacle, to said appliance chassis and back to said sensing blade at said grounding terminal, said grounding conductor being electrically connected to said grounding blade and to said appliance chassis, and said sensing conductor being electrically connected to said sensing blade and to a hot conductor providing power to said electrical appliance whereby said closed current path between said grounding and sensing conductors is formed when said grounding and sensing blades are plugged into said grounding terminal of said receptacle, and said cable further comprising a plurality of other conductors connected to said plurality of other blades; and
   a detection and alarm circuit comprising means for continuously monitoring and automatically detecting when said closed current path fails to make connection with ground.

2. The apparatus of claim 1 wherein said means for electrically isolating said grounding and said sensing blades is oriented and placed between said grounding and sensing blades in a position such that the entire assembly comprising said grounding and sensing blades and said means for electrically isolating them may be inserted as one assembly into said grounding terminal.

3. The apparatus of claim 2 wherein said grounding blade and said sensing blade are substantially flat, elongated, prong-like structures.

4. The apparatus of claim 3 wherein said means for electrically isolating said grounding and sensing blades comprises a strip of substantially flat, elongated insulating material.

5. The apparatus of claim 4 wherein said grounding blade and said sensing blade are secured to said insulating material.

6. The apparatus of claim 5 wherein the assembly formed by said grounding blade and said sensing blade secured to said insulating material forms an elongated prong-like structure adapted for insertion into said grounding terminal of said receptacle.

7. The apparatus of claim 6 wherein said elongated, prong-like structure is substantially rectangular shaped.

8. The apparatus of claim 1 wherein said means for continuously monitoring and automatically detecting when said closed current path fails to make connection with ground comprises a DC power source, a digital inverter connected to said power source and to said sensing conductor at the input of said inverter, and means for indicating when the output of said inverter changes state.

9. The apparatus of claim 8 wherein said inverter is electrically connected in common with a ground connection at said appliance chassis, and wherein said ground connection at said appliance chassis is electrically connected in common with said grounding conductor.

10. The apparatus of claim 8 wherein said monitoring and detecting means further comprises a resistive component electrically connected between said power source and said inverter.

11. The apparatus of claim 10 wherein said resistive component is sized such that the current on said grounding conductor and sensing conductor does not exceed 10 microamperes when in operation.

12. The apparatus of claim 8 wherein said means for indicating when the output of said inverter state comprises means for disconnecting said appliance from said power source.

13. The apparatus of claim 12 wherein said means for disconnecting said appliance comprises a relay connected to the output of said inverter.

14. The apparatus of claim 8 wherein said means for indicating when the output of said inverter changes state comprises means for disconnecting said appliance from said power source.

15. The apparatus of claim 14 wherein said means for isolating said inverter comprises a first diode reverse-biased with respect to the power input of said inverter and a second diode reverse-biased with respect to the output of said inverter when an alarm condition is selected by said inverter.

16. The apparatus of claim 8 wherein said means for indicating when the output of said inverter changes state comprises an audio indicator.

17. The apparatus of claim 8 wherein said means for indicating when the output of said inverter changes state comprises a light emitting diode.

18. The apparatus of claim 1 further comprising a carrier assembly comprising a first member on which said grounding and sensing blades are mounted, and a second member on which said other blades are mounted.

19. The apparatus of claim 1 further comprising a carrier assembly comprising a substantially horizontal member integrally joined to a substantially vertical support member at one end thereof, and a base member integrally joined to said support member at the other end thereof, said grounding and sensing blades being mounted to opposite sides of said horizontal member, and said other blades being mounted to said base member.

20. An apparatus that detects an open ground connection occurring anywhere between an appliance chassis and a grounding terminal of a receptacle, said apparatus comprising first and second means inserted into said grounding terminal and means forming together with said first and second means a closed current path running from said first means through said appliance chassis and back to said second means, and means continuously monitoring and detecting when any point on said closed current path becomes open.

21. An apparatus as defined in claim 20 wherein said apparatus further comprises a plug and wherein said first means comprises a grounding blade connected to said plug and said second means comprises a sensing blade connected to said plug, and further comprising a strip of insulating material for electrically isolating said grounding and sensing blades one from the other.

22. An apparatus as defined in claim 21 wherein said grounding and sensing blades and said strip of insulating material are joined together to form an elongated prong adapted for insertion into said grounding terminal of said receptacle.

23. An apparatus as defined in claim 21 further comprising a cable connected to said plug, said cable comprising a sensing conductor electrically connected to said sensing blade and a grounding conductor electrically connected to said grounding blade, said sensing and grounding conductors in combination with said sensing and grounding blades together forming said closed current path and said grounding conductor being connected in common between said grounding terminal and said appliance chassis and said sensing conductor being connected between said grounding terminal and said means for continuously monitoring and detecting when any point on said closed current path becomes open.

24. An apparatus as defined in claim 21 further comprising a plurality of other blades connected to said plug for removable connection to current supplying terminals of said receptacle, and further comprising a carrier assembly comprising a first member on which said grounding and sensing blades are mounted, and a second member on which said other blades are mounted.

25. An apparatus as defined in claim 21 further comprising a plurality of other blades connected to said plug and adapted for removable connection to current supplying terminals of said receptacle, and further comprising a carrier assembly comprising a substantially horizontal member integrally joined to a substantially vertical support member at one end thereof, and a base member integrally joined to said support member at the other end thereof, said grounding and sensing blades being mounted to opposite sides of said horizontal member, and said other blades being mounted to said base member.

26. An apparatus as defined in claim 23 wherein said means for continuously monitoring and detecting when any point on said closed current path becomes open comprises means for supplying DC power and a digital inverter connected to said means for supplying DC power, said digital inverter having an input terminal connected to said sensing conductor and an output terminal for changing state whenever said input terminal detects an open at any point on said closed current path.

27. An apparatus as defined in claim 26 wherein said means for continuously monitoring and detecting when any point on said closed current path becomes open further comprises means connected at the output of said inverter for indicating an alarm condition when said inverter changes state.

28. An apparatus as defined in claim 26 further comprising a resistive element connected between said DC power supply and said input of said inverter, said resistive element being sized so as to limit current from said DC power supply to said closed current path to less than 10 microamperes.

29. An apparatus as defined in claim 27 wherein said means for indicating said alarm condition comprises an audio indicator.

30. An apparatus as defined in claim 27 wherein said means for indicating said alarm condition comprises a light emitting diode.

31. An apparatus as defined in claim 27 wherein said means for indicating said alarm condition comprises means for disconnecting said appliance from said DC power source.

32. An apparatus as defined in claim 31 wherein said means for disconnecting said appliance comprises a relay connected to the output of said inverter and a switch responsive to said relay for disconnecting said appliance when said relay is deactivated by a change in state at the output of said inverter.

33. A method for detecting an open ground connection occurring anywhere between an appliance chassis and a grounding terminal of a receptacle, said method comprising the steps of:
   connecting a grounding conductor in common between the grounding terminal of said receptacle and said appliance chassis;
   connecting a sensing conductor at one end thereof in common with said grounding conductor of said grounding terminal of said receptacle, and connecting the other end of said sensing conductor to the input of an inverter; and connecting the input of said inverter so as to introduce a current on said sensing line, whereby said inverter will change the state of its output whenever any point on said sensing or grounding conductors is detected as an open.

34. A method as defined in claim 33 further comprising the step of limiting the current placed on said sensing conductor to less than 10 microamperes.

35. A method as defined in claim 33 further comprising the step of providing a means of audio or visual indication whenever the output of said inverter changes state so as to indicate an alarm condition.

* * * * *

UNITED STATES PATENT AND TRADEMARK OFFICE
CERTIFICATE OF CORRECTION

PATENT NO. : 4,649,454

DATED : March 10, 1987

INVENTOR(S) : Arvin O. Winterton

It is certified that error appears in the above–identified patent and that said Letters Patent are hereby corrected as shown below:

Column 4, line 46, "data" should be --date--
Column 5, line 62, "manufactureres" should be --manufacturers--
Column 6, line 27, "are" should be --is--

Signed and Sealed this

Eighteenth Day of August, 1987

Attest:

DONALD J. QUIGG

Attesting Officer     Commissioner of Patents and Trademarks